(12) United States Patent
Tanizawa et al.

(10) Patent No.: US 6,374,687 B1
(45) Date of Patent: Apr. 23, 2002

(54) VEHICLE AUTOMATIC TRANSMISSION

(75) Inventors: Shoichi Tanizawa; Takafumi Hattori; Taro Takashima, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 09/658,114

(22) Filed: Sep. 8, 2000

(30) Foreign Application Priority Data

Sep. 10, 1999 (JP) .......................................... 11-256834

(51) Int. Cl.[7] ................................................. F16H 3/10
(52) U.S. Cl. ...................................... 74/335; 192/87.11
(58) Field of Search ............................. 74/335, 336 R, 74/325, 330; 192/87.11, 87.12, 85 AA

(56) References Cited

U.S. PATENT DOCUMENTS

| | | | | |
|---|---|---|---|---|
| 3,747,730 A | * | 7/1973 | Hause ........................ | 192/3.29 |
| 4,271,951 A | * | 6/1981 | Nishimura et al. ....... | 192/106 F |
| 4,576,063 A | * | 3/1986 | Akashi et al. ............ | 74/331 |
| 4,960,005 A | * | 10/1990 | Kashiwase .................. | 74/329 |
| 4,974,473 A | * | 12/1990 | Hatakeyama ............... | 475/200 |
| 5,193,417 A | * | 3/1993 | Niiyama et al. ............ | 192/222 |
| 5,865,289 A | * | 2/1999 | Ishimaru .................. | 192/106 F |

FOREIGN PATENT DOCUMENTS

JP         62-141343         6/1987

* cited by examiner

Primary Examiner—Charles A Marmor
Assistant Examiner—Ankur Parekh
(74) Attorney, Agent, or Firm—Arent Fox Kintner Plotkin & Kahn, PLLC

(57) ABSTRACT

An automatic transmission includes a first speed clutch and a first speed hold clutch side by side, and a first speed hold gear shift stage is smoothly established and the responsiveness of disengagement of the first speed clutch is enhanced, particularly at low temperatures. The first speed clutch and the first speed hold clutch are provided side by side, a second clutch piston for engaging the first speed hold clutch, is installed in a relatively movable manner inside a first clutch piston for engaging the first speed clutch, and a check valve is provided on the first clutch piston. When a first speed hold gear shift stage is established, after first speed clutch has been engaged by supplying hydraulic fluid to a fire clutch oil chamber, the first speed hold clutch is engaged by supplying hydraulic fluid to a second clutch oil chamber. Oil outlets are formed in a clutch housing and the hydraulic oil which discharges from the opened check valve when the first speed clutch is disengaged is rapidly discharged outside the clutch outer.

3 Claims, 6 Drawing Sheets

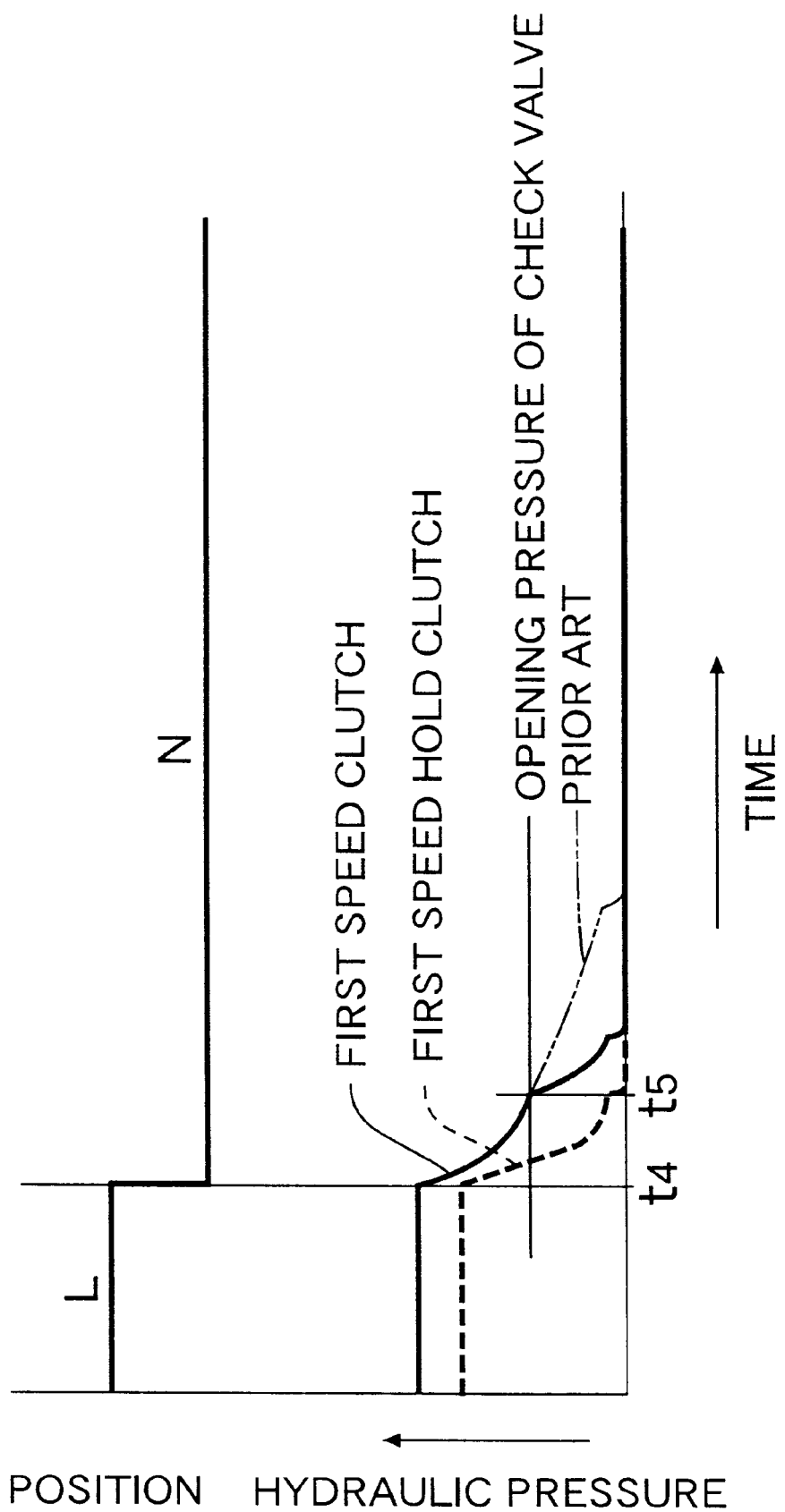

VEHICLE AUTOMATIC TRANSMISSION

BACKGROUND OF THE INVENTION

1. Field of the Invention

The present invention relates to vehicle automatic transmissions in which both a first speed clutch and a first speed ho d clutch are provided side by side.

2. Description of the Prior Art

Japanese Patent Application Laid-open No. 62-141343 discloses a continuously variable transmission for a vehicle comprising two clutches, and provides a transmission in which a pair of clutch pistons are fitted in a relatively movable manner, one of the clutches being engaged by movement of the outside clutch piston and the other clutch being engaged by relative movement of the inside clutch piston against the outside clutch piston.

In the above-mentioned prior art device, since no special consideration is given to the order in which the hydraulic pressure is applied to the two clutch oil chambers when both clutches are engaged, the operation of the two clutches is not in order and there are the problems that pulsations are caused in the transmitted torque and in-gear shock occurs. Moreover, since the supply and discharge of hydraulic fluid to and from the clutch oil chamber of one of the clutches is carried out via a single oil passage only provided inside the rotational shaft, it is difficult to discharge the hydraulic fluid from the clutch oil chamber when the engagement of one of the clutches is released and thus there is the problem that the responsiveness of the clutch disengagement is lowered, particular at low temperatures where the viscosity of the hydraulic fluid increases.

SUMMARY OF THE INVENTION

The present invention has been carried out of the above-mentioned circumstances and is directed to an automatic transmission comprising a first speed clutch and a first speed old clutch side by side. It is an object of the present invention to smoothly establish a first speed hold gear shift stage and enhance the responsiveness of disengagement of the first speed clutch, particularly at low temperatures.

In order to achieve the above-mentioned object, a vehicle automatic transmission comprises a first speed clutch for establishing a first speed gear shift stage when it is engaged, a first speed hold clutch for establishing a first speed hold gear shift stage when it is engaged, a first clutch piston for causing frictional engagement elements of the first speed clutch to be engaged with each other, and a first clutch oil chamber for driving the first clutch piston in a direction to make the first speed clutch engaged. A second clutch piston is installed inside the first clutch piston in a relatively movable manner and causes the frictional engagement elements of the fist speed hold clutch to be engaged with each other, a second clutch oil chamber drives the second clutch piston in a direction to make the first speed hold ditch engaged, and a clutch housing is shared by the first speed clutch and the first speed hold clutch. A check valve is provided on the first clutch piston which discharges hydraulic fluid from the first clutch oil chamber into the inside of the clutch housing when the hydraulic pressure of the first clutch oil chamber is less than a predetermined value and cuts off the connection between the first clutch oil chamber and the inside of the clutch housing when the hydraulic pressure of the first clutch oil chamber is at or above the predetermined level. Oil outlets are formed in the clutch housing which connect the outside and the inside of the clutch housing, when a first speed hold gear shift stage is established, after the first speed clutch has been engaged by supplying hydraulic fluid to the first clutch oil chamber, so as to drive the first clutch piston in the direction of engagement. The first speed hold clutch is engaged by supplying hydraulic fluid to the second clutch oil chamber to drive the second clutch piston relative to the first clutch piston in the direction of engagement.

In accordance with the above-mentioned arrangement, when a first speed hold gear shift stage is established, since the first speed hold clutch is engaged by supplying hydraulic fluid to the second clutch oil chamber after the first speed clutch has been engaged by supplying hydraulic fluid to the first clutch oil chamber, the speed at which the first clutch piston of the first speed clutch provides engagement and the speed at which the second clutch piston of the first speed hold clutch provides engagement, can be appropriately controlled to prevent pulsations in the transmitted torque and the occurrence of in-gear shock.

Moreover, since oil outlets are formed in the clutch housing to link the inside and the outside of the clutch housing, when the hydraulic pressure of the first clutch oil chamber of the first speed clutch is released in order to cancel the first speed hold gear shift stage, the hydraulic fluid which has been discharged from the first clutch oil chamber into the inside of the clutch housing accompanying the opening of the check can be discharged via the oil outlets from the inside of the clutch housing. Thus, even at low temperatures where the viscosity of the hydraulic fluid increases, the hydraulic fluid can be rapidly discharged from the first clutch oil chamber so as to enhance the responsiveness of disengagement of the first speed clutch.

BRIEF DESCRIPTION OF THE DRAWINGS

The practical features of the present invention are described below reference to an embodiment of the present invent shown in the attached drawings.

FIG. 6 is a time chart showing the change in hydraulic pressure when the clutches are disengaged.

DETAILED DESCRIPTION OF THE PREFERRED EMBODIMENT

Figure 1:
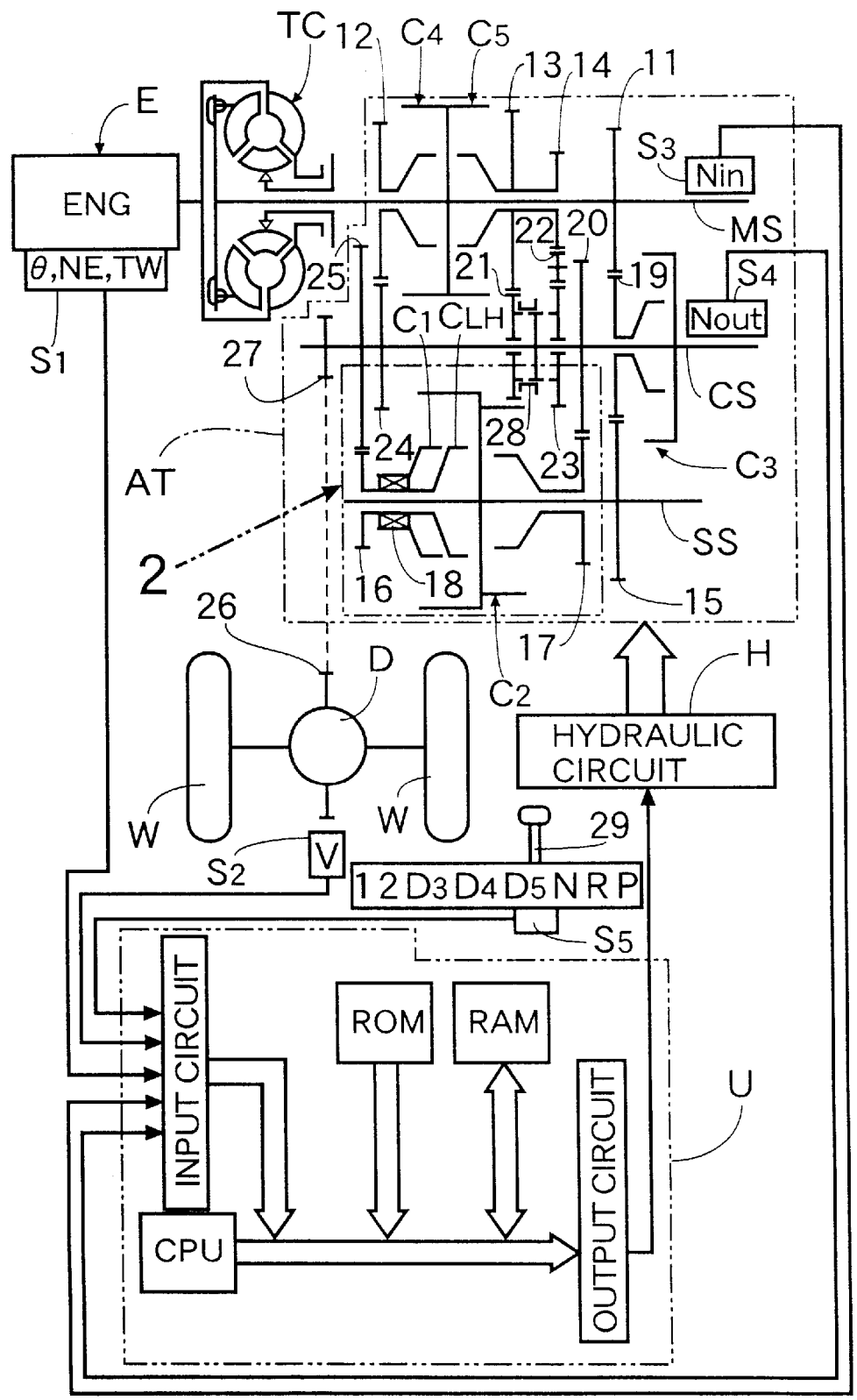
FIG. 1 is a skeleton diagram showing an automatic transmission of the present invention.

An automatic transmission AT having fire forward speeds and one reverse speed is shown in FIG. 1, and comprises a main shaft MS which is connected to an engine E via a torque converter TC equipped with a lockup clutch, a secondary shaft SS whose rotation is synchronized with the main shaft MS and a counter shaft CS which is connected to the driving wheels W of the vehicle via a differential gear D.

A main third speed gear 11 is secured on the main shaft MS, a main fourth speed gear 12 is supported via a fourth speed clutch $C_4$, and a main fifth speed gear 13 and a main reverse gear 14 are supported via a fifth speed clutch $C_5$. The fifth speed clutch $C_5$ also serves as reverse clutch.

A secondary first to second speed gear 15 secured on the secondary shaft SS, a secondary first speed gear 16 is supported via a first speed clutch $C_1$ or a first speed hold clutch $C_{LH}$ and a secondary second speed gear 17 is supported via a second speed clutch $C_2$. A one-way clutch 18 is provided between the first speed clutch $C_1$ and the secondary first speed gear 16.

A counter third speed gear 19 on the counter shaft CS, meshes with the main third speed gear 11 and the secondary first-second speed gear 15 is supported via a third speed clutch $C_3$. A counter second speed gear 20 is secured to the counter shaft CS and meshes with the secondary second speed gear 17, a counter fifth speed gear 21 which meshes with the main fifth speed gear 13, is supported in a relatively rotatable manner, a counter reverse gear 23 which meshes with the main reverse gear 14 via reverse idle gear 22, is supported in a relatively rotatable manner. A counter fourth speed gear 24 is secured to the counter shaft CS and meshes with the main fourth speed gear 12. A counter first speed gear 25 is secured to the counter shaft CS and meshes with the secondary first speed gear 16 and final drive gear 27 is secured to the counter shaft CS and meshes with the final driven gear 26 of the differential gear D. The counter fifth speed gear 21 and the counter reverse gear 23 can be selectively connected to the counter shaft CS via a selector gear 28.

An engine sensor $S_1$ for detecting the degree of throttle opening 2, the rotational rate NE and the cooling water temperature TW of the engine E, a vehicle speed sensor $S_2$ for detecting the vehicle speed V based on the rate of rotation of the differential gear D, a main shaft rotational rate sensor $S_3$ for detecting the rotational rate Nin of the main shaft MS of the automatic transmission AT, a counter shaft rotational rate sensor $S_4$ for detecting the rotational rate Nin of the counter shaft CS of the automatic transmission AT and a selector position sensor $S_5$ for detecting the position of a selector lever 29 are connected to an electronic control unit U. The electronic control unit U controls the operation of the first speed to fifth speed clutches $C_1$ to $C_5$ via a hydraulic circuit H.

Regardless of the engagement or disengagement of the first to fifth speed clutches $C_1$ to $C_5$, the rotation of the main shaft MS is transmitted to the secondary shaft SS via the main third speed gear 11, the counter third speed gear 19 and the secondary first to second speed gear 15, and the rotation of the secondary shaft SS is therefore synchronized with the main shaft MS at all times.

When the first speed clutch $C_1$ is engaged, the rotation of the secondary shaft SS is transmitted to the counter shaft CS via the first speed clutch $C_1$, the one-way clutch 18, the secondary first speed gear 16 and the counter first speed gear 25, and then from there to the driving wheels W via the final drive gear 27, the final driven gear 26 and the differential gear D. When a first speed gear shift stage is thus established, over rotation the output side (on the side of the counter shaft CS), is permitted by the clutch 18.

When the first speed hold clutch $C_{LH}$ is engaged in the above-mentioned state, the secondary first speed gear 16 is directly connected to the secondary shaft SS, without involving the one-was clutch 18, so as to establish a first speed hold gear shift stage. In this stage, since the one-way clutch 18 cannot function, over rotation on the side of the counter shaft CS is inhibited, and the rotation of the driving wheels can be transmitted back to the side of the engine E via the first speed gear shift stage so that an engine braking function is exhibited.

When the second speed clutch $C_2$ is engaged by disengaging the first speed clutch $C_1$ and the first speed hold clutch $C_{LH}$, the rotation of the secondary shaft SS is transmitted to the counter shaft CS via the second speed clutch $C_2$, the secondary second speed gear 17 and the counter second speed gear 20 to establish a second speed gear shift stage.

When the third speed clutch $C_3$ is engaged by disengaging the second speed clutch $C_2$, the rotation of the main shaft MS is transmitted to the counter shaft CS via the main third speed gear 11, the counter third speed gear 19 and the third speed clutch $C_3$ to establish a third speed gear shift stage.

When the fourth speed clutch $C_4$ is engaged by disengaging the third speed clutch $C_3$, the rotation of the main shaft MS is transmitted to the counter shaft CS via the fourth speed clutch $C_4$, the main fourth speed gear 12 and the counter fourth speed gear 24 to establish a fourth speed gear shift stage.

When the fifth speed clutch $C_5$ is engaged by disengaging the fourth speed clutch $C_4$, if the counter fifth speed gear 21 is connected to the counter shaft CS by the selector gear 28, the rotation of the main shaft MS is transmitted to the counter shaft CS via the fifth speed clutch $C_5$, the main fifth speed gear 13 and the counter fifth speed gear 21 establish a fifth speed gear shift stage. If the counter reverse gear 23 is connected to the counter shaft CS by the selector gear 28, the rotation of the main shaft MS is transmitted to the counter shaft CS via the fifth speed clutch $C_5$, the main reverse gear 14, the reverse idle gear 22 and the counter reverse gear 23 to establish a reverse gear shift stage.

Figure 2:
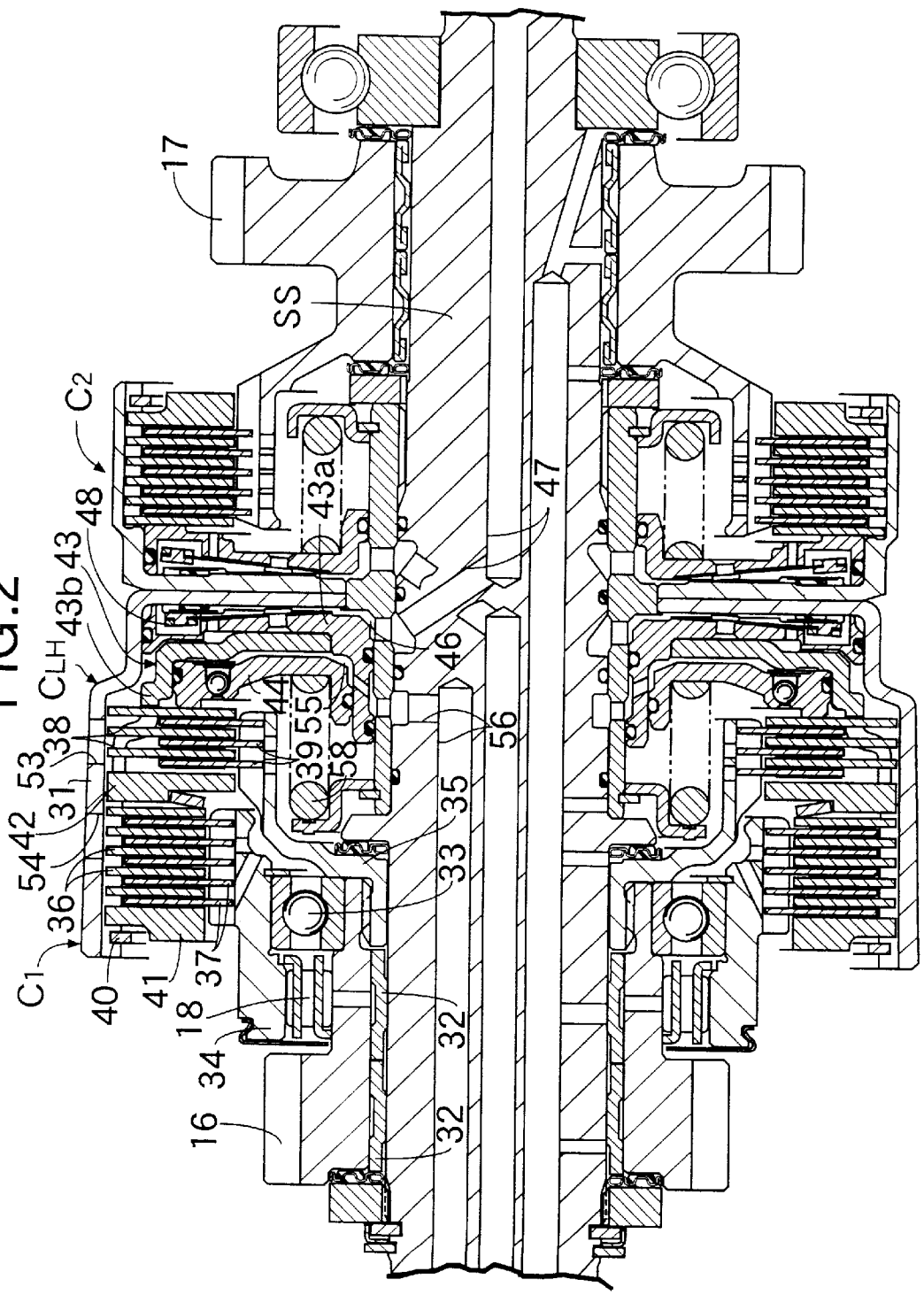
FIG. 2 is a magnification of part 2 in FIG. 1.

The structures of the first speed clutch $C_1$ and the first speed hold clutch $C_{LH}$ are explained below by reference to FIG. 2 and FIG. 3.

The clutch housing 31 which is shared by the first speed clutch $C_1$ and the first speed hold clutch $C_{LH}$ is connected by splines to the outer circumference of the secondary shaft SS. A clutch inner member 34 of the first speed clutch $C_1$ is supported via ball bearing 33 and the one-way clutch 18 on the secondary first speed gear 16 which is supported on the outer circumference of the secondary shaft SS via needle bearings 32, and a clutch inner member 35 of the first speed hold clutch $C_{LH}$ is connected by splines to the secondary first speed gear 16.

The first speed clutch $C_1$ comprises a plurality of clutch plates 36 which fit via splines with the inner circumference of the clutch housing 31 and a plurality of clutch discs 37 which fit via splines with the outer circumference of the clutch inner member 34, and these clutch plates 36 and clutch discs 37 are placed alternately in a manner such that they can come into contact with each other. The first speed hold clutch $C_{LH}$ comprises a plurality of clutch plates 38 which fit via splines with the inner circumference of the clutch housing 31 and a plurality of clutch discs 39 which fit via splines with the outer circumference of the clutch inner member 35, and these clutch plates 38 and clutch discs 39 are placed alternately in a manner so that they can come into contact with each other.

The clutch disc 37 on the far left-hand side of the first speed clutch $C_1$ is positioned opposite to a pressure plate 41, which is fastened by a clip 40 to the left end of the clutch housing 31, in a manner such that they can come into contact with each other. A pressure plate 42 is provided on the middle part in the axial direction of the clutch housing 31 and the clutch plate 38 on the far right-hand side of the first speed clutch $C_1$, is positioned opposite to the left-hand surface of the pressure plate 42 in a manner such that they can come into contact with each other. The clutch disc 39 on the far left-hand side of the first speed hold clutch $C_{LH}$ is positioned opposite to the right-hand surface thereof in a manner such that they can come into contact with each other.

The first clutch piston 43 and the second clutch piston 44 are positioned adjacent to each other inside the clutch housing 31. The first clutch piston 43 comprises a main body 43a which is supported on the clutch housing 31 in a slidable manner in the axial direction and a pressure part 43b which extends leftwards from the main body 43a an is in contact with the right-hand surface of the pressure plate 42 which is forced rightwards by a dish spring 45. A first clutch oil chamber 46 is formed between the right-hand surface of the main body 43a of the first clutch piston 43 and the clutch housing 31, and this first clutch oil chamber 46 is linked to a hydraulic circuit H via an oil passage 47 which is formed inside the secondary shaft SS.

A check valve 48 is provided on the right hand surface of the main body 43a which faces the first clutch oil chamber 46. The check valve 48 comprises a sheet-shaped valve body 49, one end thereof being fixed to the right-hand surface of the main body 43a, and a weight 50 is provided on the other end of the valve body 49. The valve body 49 can open and close a valve hole 51 which passes through the main body 43a. A space 52 which is surrounded by the main body 43a and the pressure part 43b of the first clutch piston 43 and the clutch housing 31 is linked to the first clutch oil chamber 46 via the valve hole 51 as well as to the outside of the clutch housing 31 via a plurality of oil outlets 53, 54 formed in the clutch horsing 31.

The second clutch piston 44 is supported inside the first clutch piston 43 in a slidable manner in the axial direction, and the left-hand surface of the second clutch piston 44 is positioned opposite to the right-hand surface of the clutch plate 38 on the far right-hand side of the first speed hold clutch $C_{LH}$ in a manner such that they can come into contact with each other. A second clutch oil chamber 55 formed between the left-hand surface of the first clutch piston 43 and the right-hand surface of the second clutch piston 44, is connected to the hydraulic circuit H via an oil passage 56 formed inside the secondary shaft SS. A check valve 57, which regulates the outflow of hydraulic fluid from the second clutch oil chamber 55 and permits the inflow of hydraulic fluid into the second clutch oil chamber 55, is provided on the second clutch piston 44. The first clutch piston 43 and the second clutch piston 44 are forced rightwards (the direction of disengagement) by a clutch spring 58 which is in contact with the left-hand surface of the second clutch piston 44.

Next, the action of the embodiment of the present invention having the aforementioned arrangement is explained.

Figure 5:
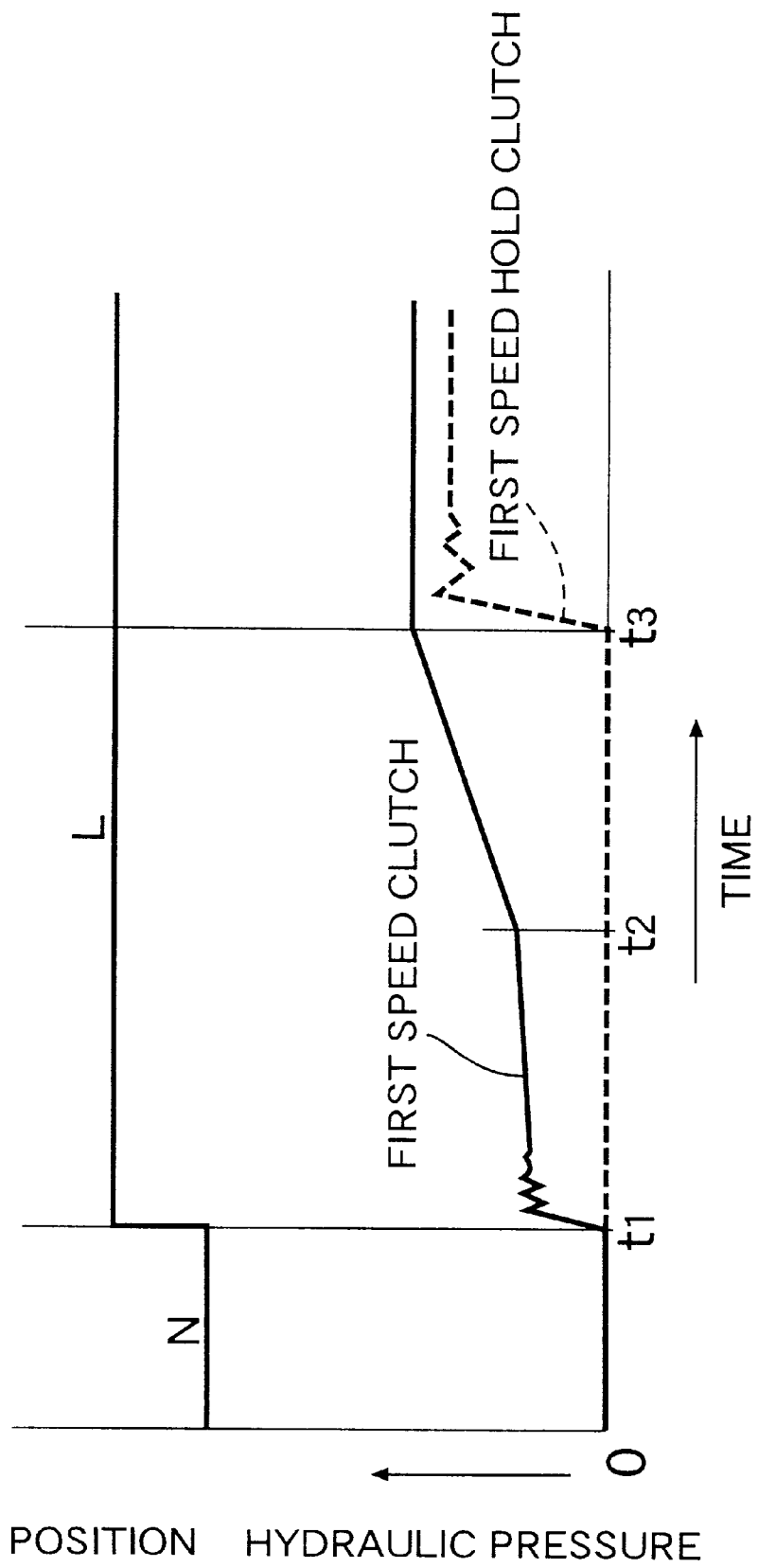
FIG. 5 is a time chart showing the change in hydraulic pressure when the clutches are engaged.

FIG. 5 shows the change in clutch hydraulic pressure when the selector lever 29 is operated and moved from the 'N' position (neutral position) to the 'L' position (first speed hold position). The hydraulic pressure of the first speed clutch $C_1$ rises partially at time $t_1$ when the selector lever 29 is operated, subsequently increases with a gradual slope until time $t_2$ and then increases with a somewhat steeper slope until time $t_3$ to reach a target value (solid line). On the other hand, the hydraulic pressure of the first speed hold clutch $C_{LH}$ rises to the target value as soon as a hydraulic pressure sensor (not illustrated) detects that the hydraulic pressure of the first speed clutch $C_1$ has reached the target value at time $t_3$ (broken line).

If the first clutch piston 43 and the second clutch piston 44 are operated simultaneously, since the speed of the second clutch piston 44 which is supported on the first clutch piston 43 and moves integrally therewith, results from the sum of the speeds of movement of the two clutch pistons 43, 44, there are the problems that in-gear shock is caused by the rapid engagement of the first speed hold clutch $C_{LH}$ and pulsations are caused in the transmitted torque by the disorderly engagement of the first speed clutch $C_1$ and the first speed hold clutch $C_{LH}$.

However, in the present invention, when a first speed hold gear shift stage is established, the speeds of engagement of the first clutch piston 43 and the second clutch piston 44 are appropriately controlled by engaging the first speed hold clutch $C_{LH}$ after engaging the first speed clutch $C_1$, and thus the pulsations in the transmitted torque at the time of engagement of the two clutches $C_1$, $C_{LH}$ can be prevented and the in-gear shock can be lessened. In particular, since two levels are employed for the rate of increase in the hydraulic pressure of the first speed clutch $C_1$, the clearance between the clutch plates 36 and the clutch discs 37 is narrowed in the first range in which the rate of increase is low, and the clutch plates 36 and the clutch discs 37 can be engaged smoothly with good responsiveness in the second range in which the rate of increase is high.

Figure 3:
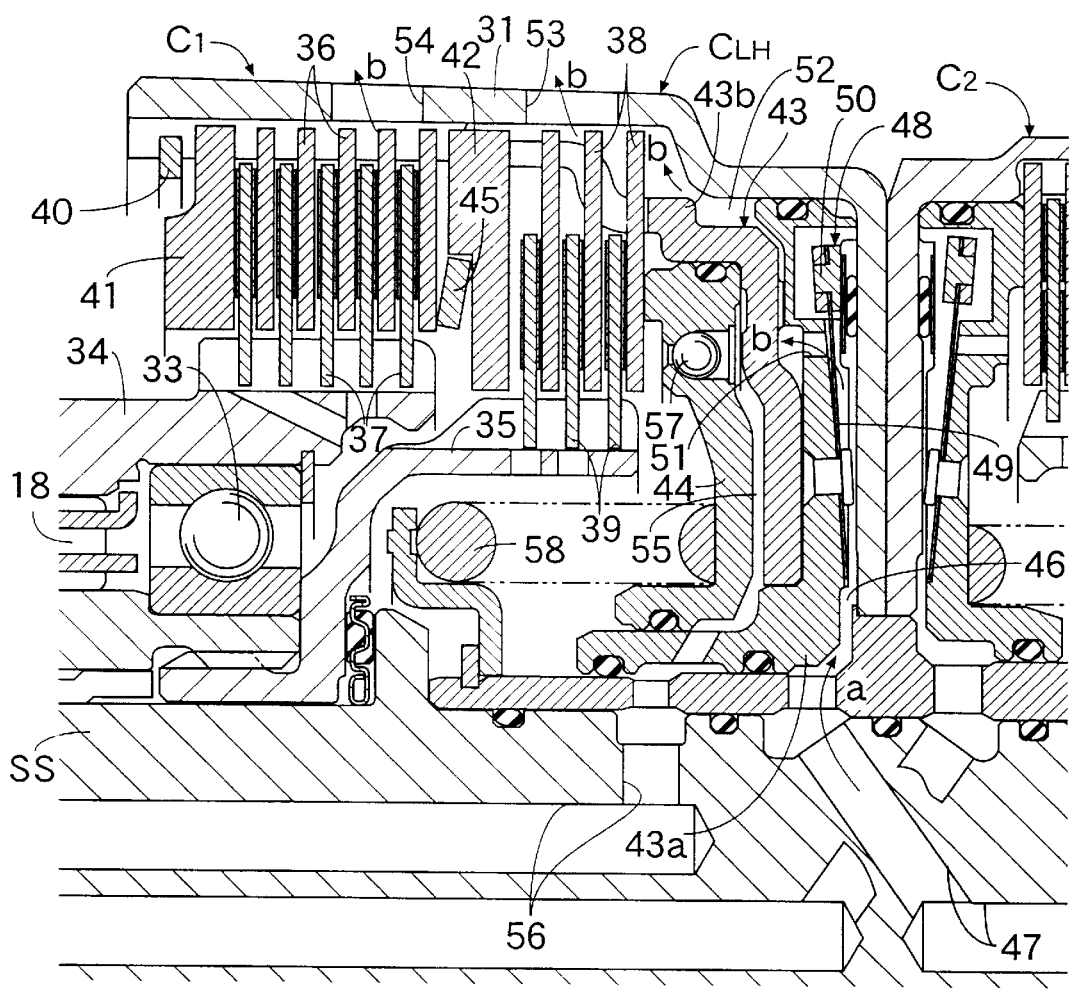
FIG. 3 is a magnification of the essential part in FIG. 2.

To explain the action of establishing the first speed hold gear shift stage further in detail, the check valve 48 is open when the hydraulic pressure which is applied to the first clutch oil chamber 46 of the first speed clutch $C_1$ is low, and the hydraulic fluid which has been supplied from the oil passage 47 of the secondary shaft SS to the first clutch oil chamber 46 is discharged outside the clutch housing 31 via the valve hole 1, the space 52 and the oil outlets 53, 54 (arrows a and b in FIG. 3). Since the check valve 48 closes when the hydraulic pressure which is applied to the first clutch oil chamber 46 reaches a critical value, the first clutch piston 43 whose main body 43a is under pressure from the hydraulic fluid, moves leftwards so that the pressure part 43b presses the pressure plate 42, and thus the clutch plates 36 and the clutch discs 37 are pressed between the two pressure plates 41, 42. As a result, the clutch inner member 34 is connected to the clutch housing 31 and the first speed clutch $C_1$ is engaged to establish a first speed gear shift stage.

In this stage, although the second clutch piston 44 is moved leftwards against the clutch spring 58 by being pushed by the first clutch piston 43 which is moving leftwards, since the pressure plate 42 also moves leftwards according to the movement a constant gap is maintained between the second clutch piston 44 and the pressure plate 42 and the first speed hold clutch $C_{LH}$ is not engaged.

The check valve 48 provided on the first clutch piston 43 which always rotates together with the secondary shaft SS is forced in the direction that opens the valve by the centrifugal force which is applied to the weight 50. Therefore, when the rotational rate of the engine is low and the transmitted torque is small (when the rotational rate of the secondary shaft SS is low), since the check valve 48 closes under conditions in which the hydraulic pressure conveyed to the first clutch oil chamber 46 is low, the hydraulic pressure of the first clutch oil chamber 46 rises rather quickly. On the other hand, when the rotational rate of the engine is high and the transmitted torque is large (when the rotational rate of the secondary shaft SS is high), since the check valve 48 closes under conditions in which the hydraulic pressure conveyed to the first clutch oil chamber 46 is high, the hydraulic pressure of the first clutch oil chamber 46 rises rather slowly. Thus, the in-gear shock can be lessened yet more effectively.

Figure 4:
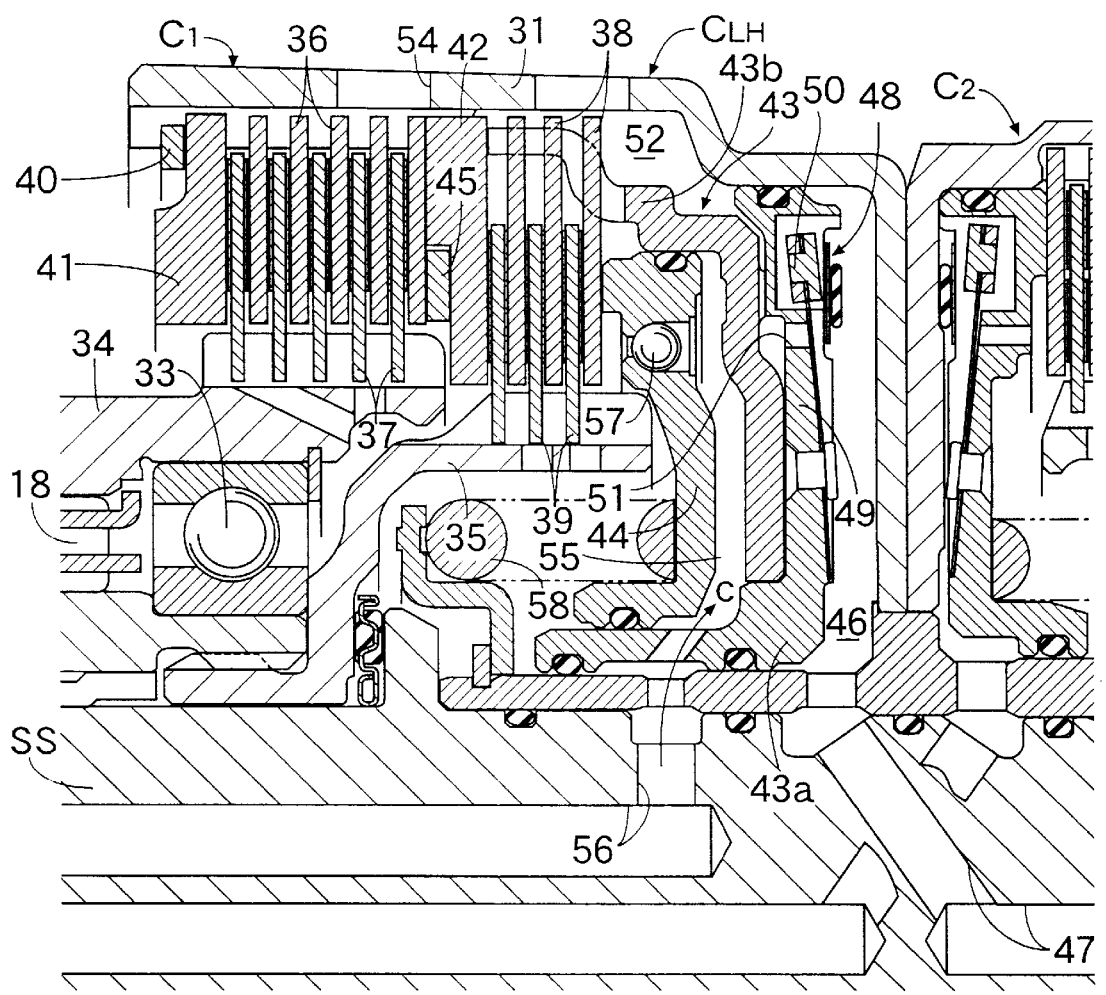
FIG. 4 is a diagram explaining the action of FIG. 3.

If hydraulic pressure is supplied from the oil passage 56 of the secondary shaft SS to the second clutch oil chamber 55 (see arrow c in FIG. 4). under conditions in which the first speed clutch $C_1$ is engaged so as to establish a first speed gear shift stage as describes above, the second clutch piston 44 moves leftwards relative to the first clutch piston 43 so as to press the clutch plates 38 and the clutch discs 39 against the pressure plate 42. As a result, the clutch inner 35 is connected to the clutch housing 31 so as to engage the first speed hold clutch $C_{LH}$ and thus a first speed hold gear shift stage is established. When hydraulic pressure is applied to the second clutch oil chamber 55, the check valve 57 provided on the second clutch piston 44 closes so as to prevent the hydraulic pressure from leaking from the second clutch oil chamber 55.

FIG. 6 shows the change in clutch hydraulic pressure when the selector lever 29 is operated and moved from the 'L' position (first speed hold position) to the 'N' position (neutral position). At time $t_4$ when the selector lever 29 is operated the hydraulic pressure of the first speed clutch $C_1$ and the hydraulic pressure of the first speed hold clutch $C_{LH}$ are simultaneously reduced, and the second clutch piston 44 and the fist clutch piston 43 move rightwards as a result of the resilient force of the clutch spring 58. In this stage the hydraulic fluid of the first clutch oil chanter 46 of the first speed clutch $C_1$ is discharged into the oil passage 47 of the secondary shaft SS and the hydraulic fluid of the second clutch oil chamber 55 of the first speed hold clutch $C_{LH}$ is discharged into the oil passage 56 of the secondary shaft SS; the check valve 48 opens when the hydraulic pressure of the first clutch oil chamber 46 decreases to a predetermined value and a proportion of the hydraulic fluid of the first clutch oil chamber 46 is discharged into the space 52 of the clutch housing 31 via the valve hole 51 of the opened check valve 48.

In this stage, since the outlets 53, 54 are formed in the clutch housing 31 so as to link the inside and outside of the clutch housing 31, the hydraulic fluid which has been discharged into the space 52 of the clutch housing 31 from the first clutch oil chamber 46 accompanying the opening of the check valve 48 is rapidly discharged outside the clutch housing 31. In particular, since the viscosity of the hydraulic fluid increases at low temperatures, the discharge of hydraulic fluid from the first clutch oil chamber 46 cannot be carried out smoothly thus causing the problem that the responsiveness of disengagement of the first speed clutch $C_1$ is decreased, but the discharge of the hydraulic fluid can be promoted by the outlets 53, 54 of the clutch housing 31 thereby enhancing the responsiveness of disengagement of the first speed clutch $C_1$ at low temperatures.

In addition, if the pressure of the interior of the second clutch oil chamber 55 becomes negative while the first speed clutch $C_1$ and the first speed hold clutch $C_{LH}$ are being disengaged, the check valve 57 provided on the second clutch piston 44 opens enabling the second clutch piston 44 to move smoothly.

As shown in FIG. 6, after the check valve 48 opens at time $t_5$, in the present invention having the outlets 53, 54 on the clutch housing 31 the hydraulic pressure rapidly decreases as shown by, the solid line, but in the prior art having no outlets 53, 54 on the clutch housing 31, the hydraulic pressure decrease is delayed to as shown by the dashed dotted line.

As hereinbefore described, in accordance with the invention, when a first speed hold gear shift stage is established, since first speed hold clutch is engaged by supplying hydraulic fluid to the second clutch oil chamber after the first speed clutch has been engaged by supplying hydraulic fluid to the first clutch oil chamber, the speed at which the first clutch piston of the first speed clutch is engaged and the speed at which the second clutch piston of the first speed hold clutch is engaged can be appropriately controlled to prevent pulsations in the transmitted torque and the occurrence of in-gear shock.

Moreover, since oil outlets are formed in the clutch housing to link the inside and the outside of the clutch housing, when the hydraulic pressure of the first clutch oil chamber of the first speed clutch is released in order to cancel the first speed hold gear shift stage, the hydraulic fluid which has been discharged from the first clutch oil chamber into the inside of the clutch housing accompanying the opening of the check valve can be discharged via the oil outlets from the inside of the clutch housing. Thus, even at low temperatures where the viscosity of the hydraulic fluid increases, the hydraulic fluid can be rapidly discharged from the first clutch oil chamber so as to enhance the responsiveness of disengagement of the first speed clutch.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicle automatic transmission comprising:
   a first speed clutch for establishing a first speed gear shift stage when engaged,
   a first speed hold clutch for establishing a first speed hold gear shift stage when engaged,
   a first clutch piston for causing frictional engagement elements of the first speed clutch to be engaged with each other,
   a first clutch oil chamber for driving the first clutch piston in a direction to make the first speed clutch engaged,
   a second clutch piston relatively movably positioned inside the first clutch piston, the second clutch piston causing the frictional engagement elements of the first speed hold clutch to be engaged with each other,
   a second clutch oil chamber for driving the second clutch piston in a direction to make the first speed hold clutch engaged,
   a clutch housing shared by the first speed clutch and the first speed hold clutch,
   a check valve on the first clutch piston for discharging hydraulic fluid from the first clutch oil chamber into the inside of the clutch housing when the hydraulic pressure of the first clutch oil chamber is less than a predetermined value and cutting off the connection between the first clutch oil chamber and the inside of the clutch housing when the hydraulic pressure of the first clutch oil chamber is at or above the predetermined level, and
   wherein when a first speed hold gear shift stage is established, after the first speed clutch has been engaged by supplying hydraulic fluid to the first clutch oil chamber to drive the first clutch piston in the direction of engagement, the first speed hold clutch is engaged by supplying hydraulic fluid to the second clutch oil chamber to drive the second clutch piston relative to the first clutch piston in the direction of engagement.

2. A vehicle automatic transmission as set forth in claim 1, further including oil outlets formed in the clutch housing, the oil outlets connecting the outside and the inside of the clutch housing.

3. A vehicle automatic transmission as set forth in claim 1, wherein the second clutch piston is slidably positioned inside the first clutch piston.

* * * * *